United States Patent [19]
Petry, III et al.

[11] Patent Number: 5,859,923
[45] Date of Patent: Jan. 12, 1999

[54] MARK QUALITY INSPECTION APPARATUS AND METHOD

[75] Inventors: John P. Petry, III, Newton; Len L. Picard, Wilmington, both of Mass.

[73] Assignee: Cognex Corporation, Natick, Mass.

[21] Appl. No.: 785,822

[22] Filed: Jan. 9, 1997

Related U.S. Application Data

[63] Continuation of Ser. No. 448,078, May 23, 1995, abandoned, which is a continuation of Ser. No. 998,579, Dec. 29, 1992, abandoned.

[51] Int. Cl.[6] .................................................. G06K 9/00
[52] U.S. Cl. ........................ 382/141; 382/147; 382/218
[58] Field of Search ............................... 364/551.01, 552, 364/559, 525; 382/141, 145, 146, 147, 148, 149, 209, 218

[56] References Cited

U.S. PATENT DOCUMENTS

| | | | |
|---|---|---|---|
| 4,674,861 | 6/1987 | Kawamura | 364/525 |
| 4,932,065 | 6/1990 | Feldgajer | 382/14 X |
| 4,972,359 | 11/1990 | Silver et al. | . |
| 5,060,276 | 10/1991 | Morris et al. | 382/8 |
| 5,091,968 | 2/1992 | Higgins et al. | 382/30 |
| 5,093,867 | 3/1992 | Hori et al. | 382/8 |
| 5,119,435 | 6/1992 | Berkin | 382/8 |
| 5,151,951 | 9/1992 | Ueda et al. | 382/14 X |
| 5,230,027 | 7/1993 | Kikuchi | 382/8 |
| 5,253,306 | 10/1993 | Nishio | 382/8 X |
| 5,271,068 | 12/1993 | Ueda et al. | 382/30 |
| 5,299,269 | 3/1994 | Gaborski et al. | 382/14 X |
| 5,367,578 | 11/1994 | Golem et al. | 382/218 |
| 5,371,690 | 12/1994 | Engel et al. | 364/559 |
| 5,384,711 | 1/1995 | Kanai et al. | 382/147 |
| 5,436,979 | 7/1995 | Gray et al. | 382/141 |
| 5,440,648 | 8/1995 | Roberts et al. | 382/141 |
| 5,448,650 | 9/1995 | Desai et al. | 382/141 |
| 5,657,403 | 8/1997 | Wolff et al. | . |

OTHER PUBLICATIONS

Cognex: Vision for Industry, "Board–Level Machine Vision Systems" Technical Description Manual, 1990.

*Primary Examiner*—Eric W. Stamber
*Attorney, Agent, or Firm*—Russ Weinzimmer, Esq.

[57] ABSTRACT

A machine vision system for inspection of a mark (such as a multi-character mark) on an IC device as shown. The system provides search and defect analysis for the mark, individual characters of the mark, and the foreground and the background of the mark. The system provides for search and defect analysis reports thereof. It includes components for operator training search and defect analysis models for the whole mark, and for automatic training of such models for individual characters of the mark.

6 Claims, 4 Drawing Sheets

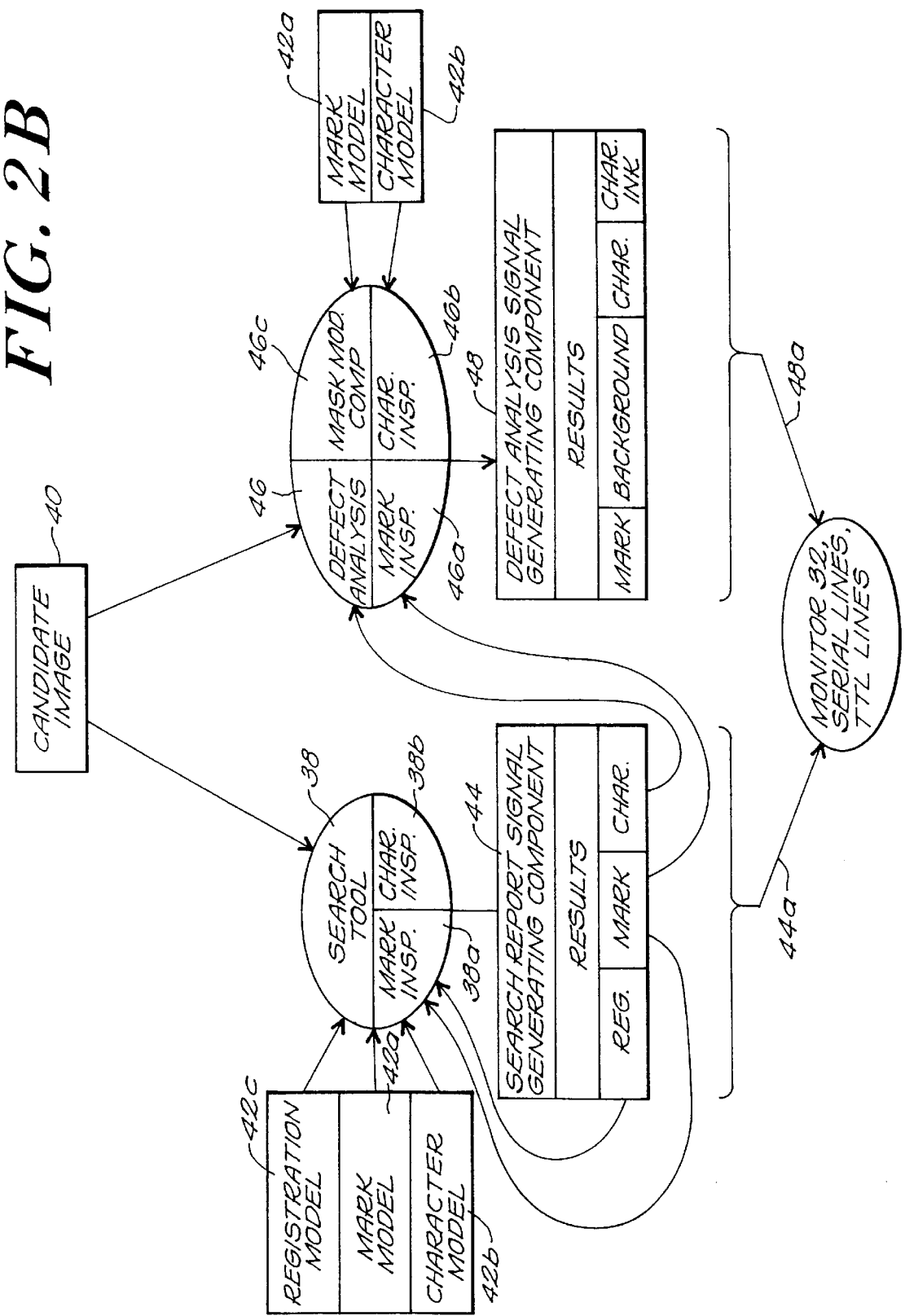

MARK QUALITY INSPECTION APPARATUS AND METHOD

This is a continuation of application Ser. No. 08/448,078 filed on May 23, 1995 now abandoned which is a continuation of application Ser. No. 07/998,579 filed Dec. 29, 1992 now abandoned.

This invention relates to machine vision systems for inspecting the quality of marks, such as printed labels, etched characters, and the like, on objects. It has application, for example, in the inspection of marks on integrated circuit devices.

BACKGROUND OF THE INVENTION

Machine vision systems for the automatic inspection of products include subsystems for inspection of marks on those products, and for reporting the quality of certain characteristics of the inspected mark that the manufacturer of the product considers important.

A "search" component is a common component of many such machine vision systems. Such a component, with a model of a sought-for image in its memory, will search a video image for a region that corresponds to the model.

A "defect analysis" component is another component of some machine vision systems. Such a component, given the model of the sought-for image, will compare the model with the image found in the video inspection, and process the differences in whatever manner is selected by the manufacturer.

Character quality inspection systems have been devised that inspect printed characters on a device or a label and report on the quality or accuracy of the characters.

There is need, however, for improvement in machine vision systems for inspecting the quality of marks on integrated circuit devices, and for reporting comprehensively the various aspects of the quality of the mark and of individual characters of the mark.

SUMMARY OF THE INVENTION

The foregoing objects are attained by the invention which provides, in one aspect, an improved mark inspection apparatus. The apparatus includes a video camera that generates a digital image of a mark, as well as "training" tools that generate search and defect analysis models from training (or sample) marks provided by an operator. The apparatus further includes a search tool that determines various attributes of the run-time, or candidate, mark, e.g., location, contrast and score. It also includes a defect analysis tool that determines the deviation from a model of the candidate mark.

The improvement is characterized, in part, as a training element that invokes operation of search and defect analysis training to generate models of the mark and also of subcomponents, such as characters, of the mark. The improvement further provides for an inspection element that invokes the search tool and the defect analysis tool to quantify the respective attributes of the mark and its subcomponents, and their deviation from training data. An output element generates a report signal reflecting both the attributes (e.g., location) and quality of the mark and the subcomponents.

In still another aspect of the invention, the character training and character inspection elements can include partitioning functionality for automatically initially identifying subcomponents of the mark (which the user can adjust).

In another aspect of the invention, the training means invokes operation of the defect analysis training means to generate defect analysis models of at least portions of the background or foreground of the mark and/or subcomponents of the mark, where the foreground is usually ink on a solid background, but could be the result of some other process such as laser etching, the inspection means invokes the defect analysis means for operation on the background or foreground of either mark and/or subcomponent, and means for generating reports thereof are included. In the event the locations of the subcomponents identified during training differ from those identified during inspection, a system according to the invention can selectively mask the subcomponent locations to properly identify defects in the mark background or foreground.

BRIEF DESCRIPTION OF THE DRAWINGS

Other objects, features and advantages of the invention will be set out below, or will be seen to be inherent in the following description of a preferred embodiment of the invention, including the drawing thereof, in which:

FIGS. 2A and 2B are block diagrams of the training and run-time components of the print quality inspection system of the invention.

DETAILED DESCRIPTION OF THE ILLUSTRATED EMBODIMENT

Figure 1:
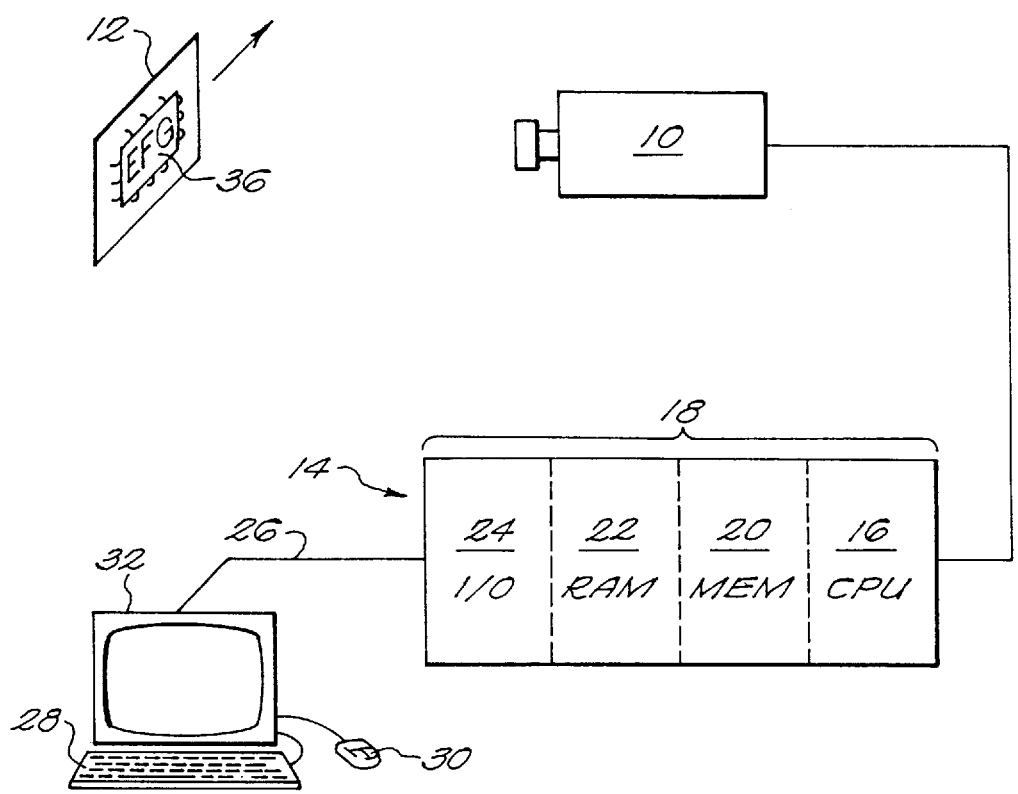
FIG. 1 is a diagrammatic representation of a machine vision system embodying the print quality inspection system of the invention.

Referring to FIG. 1, a system for mark inspection includes a video camera 10 for acquiring a digital image of an object being inspected, e.g., integrated circuit device 12. The output of the video camera 10 is routed to a vision processing system 14, which includes central processing unit (CPU) 16, random access memory 22, an input/output subsystem 24, a frame grabber (not shown), as well as, preferably, non-volatile memory (e.g., disk drive) 20. Input/output lines 26 connect the system 14 to peripheral devices as a host computer 28, trackball 30, monitor 32, etc.

Input/output subsystem 24 accepts input from camera 10, a TTL line to trigger image acquisition, and serial lines for the trackball 30 and host computer 28. The subsystem 24 drives, as output, images for display on the monitor 32, a TTL strobe line, TTL result lines and serial data for the host computer 28. These input/output functions are preferably provided in a manner conventional in the art. It will be appreciated that these functions can be augmented or supplemented in the conventional manner to facilitate the acquisition, analysis and output of information as described further below.

The camera 10 (and associated digitizing hardware) acquires an image of the object 12 and produces from it a digital signal consisting of a stream of pixels. This is output to the system 14 which assembles the stream into an array of pixels and which determines the location, orientation and quality of the object 12 and portions thereof, e.g., mark 36, in the manner described below. Those operations can be observed and selected by an operator via host computer 28, monitor 32 and trackball 30.

In a preferred embodiment, system 14 is a general purpose computer, e.g., based on the Motorola 68000-series processors, which provide automated inspection of mark 36, e.g., a multi-character mark. That operation is carried out by elements 16, 20, 22 and 24, collectively referred to as image analyzer 18—which are programmed to operate in the manner described below. The system 14 also includes special purpose hardware to speed up the automated inspection, such as the vision processing chip provided by Cognex under the description VC-1 and described in U.S. Pat. No. 4,972,359, and the vision processing chip provided by Cognex under the designation VC-2, described in co-pending application Ser. No. 07/891,955 now U.S. Pat. No. 5,657,403. Software for operating the system is set forth in Appendix A which appendix is not printed as part of the present document, but is available as part of the associated file wrapper in the U.S. Patent and Trademark Office.

Figure 2A:
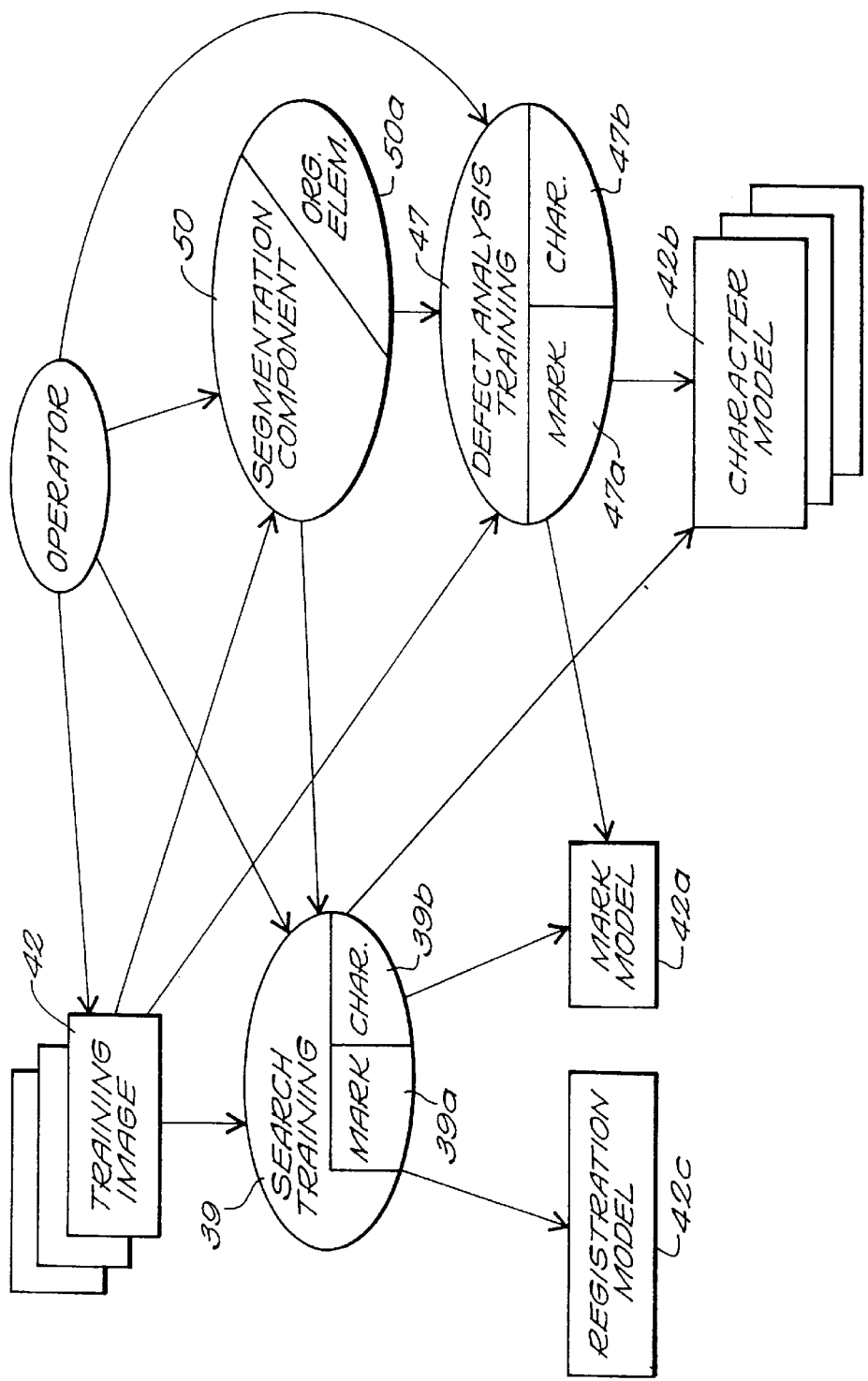

Referring to FIG. 2B, the image analyzer 18 includes search tool 38 for determining the location of an object being inspected. "Search" is a conventional machine vision tool. It locates objects in the digitized representation of the test video image 40 by comparing a gray level model of the object of interest with a model stored in the analyzer's memory. The position at which the search model best matches the image is considered to be the location of the object.

The tool 38 also determines other attributes of the object being inspected. Thus, when a match is located, the search tool 38 calculates a correlation, or "shape score," which is a measure of how closely the search model matches the located object. Those skilled in the art will, of course, appreciate that other techniques (such as Hough transforms) may be used to generate the shape score and position. The search tool 38 operates on a full range of gray-scale values, as opposed to a binary approach in which every image pixel is reduced to either black or white.

The search tool 38 can be any of several known search tools, e.g., as sold by Itran, Applied Intelligent Systems, Inc., ("AISI") and/or Imaging Technology, Inc. ("ITI"). A preferred such tool is sold by the assignee hereof, Cognex Corporation, under the trade name "Search."

The search tool 38 requires that an operator first "train" the system (FIG. 2A) by storing a model of the pattern of interest in the machine vision system's memory 22. During training 39 the system preferably captures a standard or ideal image 42 of the object 12 and displays it on the accompanying monitor 32. The operator uses, for example, trackball 30 to identify the portion of the image 42 that will be used as the model. Those skilled in the art will appreciate that for applications in which it is difficult to capture an image 42 with a good representative model, the operator can capture several images 42 and statistically combine them to reduce the effects of problems such as noise and minor defects.

The search tool 38 also includes a search report signal generating component 44 that derives a signal that reports position, shape score and contrast. Position is the xy coordinate of the location where the model best matches the image. The search report signal generating component 44 derives the shape score from a correlation calculation to reflect the degree of match between the stored model and the feature found in the candidate image 40. In the illustrated embodiment, it is expressed on an arbitrary scale from 0 (indicating no match at all) to 1000 (indicating a perfect match). The search report signal generating component 44 also includes elements for deriving and reporting the relative contrast of the feature found in the candidate image 40 with respect to that of the model.

In a preferred embodiment, the operator uses the search tool 38 to train 39 a unique registration point on the object 12 as an initial search model 42C. This serves as a fiducial to speed location of the mark 36 on the object 12. Searching for the fiducial and searching for the mark also insures that the mark 36 is in the proper relationship to the object 12. For example, it distinguishes an inverted mark on an inverted object from a properly oriented mark on a properly oriented object. The registration point on the part is conventionally a reference mark molded into the IC device near pin 1 of the array of pins on the object 12 and the reference mark is sometimes called "pin 1."

The image analyzer 18 also includes a defect analysis component 46. Defect analysis is a machine vision tool for locating flaws and defects within complex, patterned images. The defect analysis component 46 is, like the search tool 38, a common component of image analysis systems sold by those active in the machine vision field mentioned earlier (e.g., ITI and/or AISI), and the defect analysis tool sold by Cognex Corporation under the trade name "Golden Template Comparison" is preferably used.

The defect analysis component 46 compares the candidate image 40 to the model 42—or template—stored in the memory 22 of the image analyzer 18. The component 46 has elements for subtracting the template from the candidate image 40. It also has elements for analyzing the difference image and comparing it to criteria set by the operator to determine if defects are present.

To train 47 the defect analysis component 46, the operator uses the model 42 for the search tool 38. The defect analysis component 46 subtracts the image component of the model, or template, which defines what a typical good object should look like, from the candidate image 40 at run-time. By using an average of samples to represent a good part, the defect analysis component 46 reduces the variation between the stored template and the candidate image 40, thereby making it less susceptible to false defects.

The defect analysis component 46 also has elements for creating a standard deviation image, which distinguishes those areas on the object of interest where there is little variation from part to part, and those areas in which there is a great deal of variation from part to part. This allows the image analyzer 18 to be less sensitive to defects in some areas and more sensitive to defects in other areas, such as those in which there is typically little variation.

The defect analysis component 46 also generates a histogram of the mean of the training image(s) for use in contrast matching at run-time.

The operator also preferably sets parameters that define what constitutes a defect for the defect analysis component 46. This includes specifying parameters to eliminate insignificant information, and indicating the size and shape of unacceptable variations. One such technique is through the use of morphological filters.

Conventionally, the defect analysis component 46 also incorporates contrast normalization elements, by which it normalizes, or matches, the contrast of the candidate image (s) 40 to the model, or template, stored in memory 22. This enables it to automatically compensate for uniform variations in illumination intensity, camera gain and offset, and f-stop, as well as for some variations in object reflectance.

The defect analysis component 46 incorporates elements to subtract the candidate image 40 from the template, producing a difference image that contains all the variations between the two images. It includes comparison means to compare this difference image to the standard deviation image stored in memory 22 to determine which data should be ignored and which data should be analyzed as possible defects.

The defect analysis component 46, preferably, also uses morphology elements to eliminate or isolate certain data within the difference image prior to classifying defects. For example, morphology can be used to filter out variations due to video noise or small defects that would not require the part to be rejected. Morphology could also be used to isolate data of a certain shape, such as a line of pixels that represent erroneous streaks of ink.

The defect analysis component 46 also includes a defect analysis signal generating component 48 that derives a signal that reports the defect analysis results.

When the illustrated system is in use, object 12 passes before the video camera 10, and a candidate image 40 is sent to the image analyzer 18. The search tool 38 searches for the registration point, "pin 1," on the board object 12. With "pin 1" located, the expected mark position can be inferred because of its known relationship to pin 1. The search report signal generating component 44 produces a shape score for pin 1.

As noted, searching for the fiducial, or "pin 1," serves two purposes: speeding location of the mark and determining whether the object is oriented correctly. In this regard, there are four possible cases:

a) Both the mark and object are properly oriented. In this case, reliance on the fiducial speeds up the search procedure.

b) The object is upside down, and the mark is properly oriented with respect to the object. Here, while the fiducial alone indicates that the object is upside down, the search procedure will nevertheless fail because the mark is upside down with respect to the camera.

c) The object is properly oriented, but the mark is upside down with respect to the object. Here, again, the search procedure will fail because the mark is upside down with respect to the camera.

d) The object is upside down, and the mark is upside down with respect to the object (but properly oriented with respect to the camera). Here, reliance on the fiducial is critical, since the mark would otherwise appear correct to search.

The search tool 38 searches 38*a* for the mark 36 on the object 12, and the search report signal generating component 44 generates a signal representing such attributes of the mark as a shape score, a position and the amount of contrast between the mark 36 and background.

The defect analysis component 46 subtracts the template from the candidate image 40. It analyzes the difference image and compares it to criteria set by the operator to determine if defects are present. The defect analysis report signal generating component 48 generates a signal representing the attributes of the mark as a score based on the criteria.

The search report signal 44*a* and the defect analysis report signal 48*a* are sent to the monitor 32, or parallel or serial I/O lines, where, in combination, they provide a mark inspection report that is highly desirable and effective.

Figure 3A:
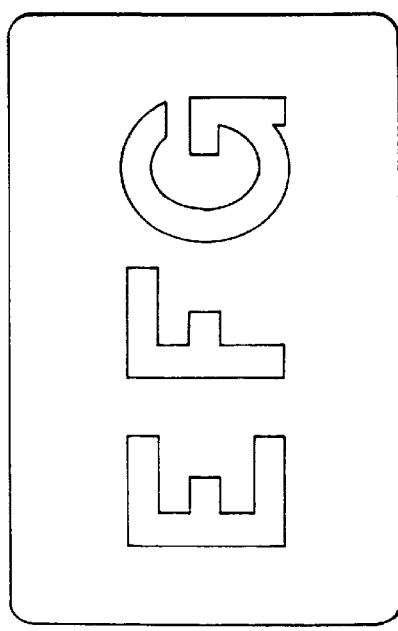
FIGS. 3A, B, C and D illustrate various regions of the mark being inspected.
Figure 3B:
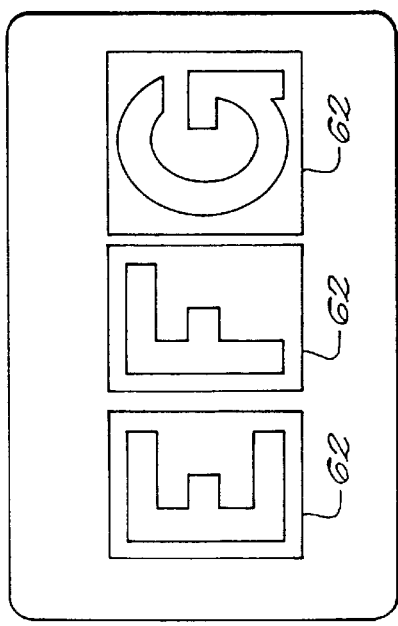

In another aspect of the preferred embodiment, individual characters of the mark 36 are individually trained 39*b*, 47*b*, to provide search and defect analysis models 42*b* for each character. The training is automatic. That is, a partitioning component 50 partitions the mark into characters 62 (see FIG. 3B) for individual training 39*b*, 47*b*.

The partitioning component 50 uses blob analysis and includes the conventional elements of blob analysis known to those skilled in the art. The partitioning component 50 includes elements, for example, to consider all pixels darker than some threshold value to be object pixels and all pixels lighter than the threshold to be background pixels (or vice versa). Preferably, a modified thresholding element that involves pixel weighting is used. That is, it gives each edge pixel a weight depending on its exact gray-scale content. A pixel containing mostly object will receive a heavier weight than a pixel containing mostly background. An element to carry out connectivity analysis is also included to determine whether object pixels are all joined together in one "blob" or whether, instead, there are two or more separate "blobs." The operator sets a threshold for the size of the "blob" to be analyzed, filtering out noise and other artifacts that are not of interest.

The partitioning component 50 thus uses blob analysis to automatically determine the regions in which characters lie. These regions include both the character ink (foreground) pixels and the non-ink (background) pixels immediately surrounding the character (see FIG. 3B). The operator can then confirm and adjust the system to automatically train the characters for search 38*b* and defect analysis 46*b*. Furthermore, the partitioning component 50 includes elements 50*a* to automatically organize the characters into lines, with the operator designating how many lines there are in the mark. As a result, a menu for operation of the system can conveniently refer to characters and lines, such as "first character of second line."

The search and defect analysis report signal generating components 44 and 48 of the system, in this aspect, also report such attributes of each character as shape score, position and contrast (from search) and a defect analysis score (from template comparison).

In another aspect of the invention, a background and foreground defect analysis component is provided. The training component 47 of the system for training the defect analysis model creates masks of the ink and background portions of the model in question (character 42*b* or mark 42*a*). The masks are incorporated into the defect analysis model 42*a* or 42*b*, and are used or not, according to the analysis selected by the operator.

A mask can be used to select or exclude the ink or background portions of the mark for defect analysis. In the preferred embodiment, per-character defect analysis 46*b* can be performed on (1) each whole character—that is, the ink and surrounding background pixels—or on (2) just the ink pixels of the character region and/or on (3) the background of the characters. Defect analysis 46*a* of the mark can be done on (1) the mark as a whole, or on (2) the mark foreground and/or on (3) the mark background pixels.

In the preferred embodiment, the ink masks are dilated by a padding factor and background masks are eroded by the same factor, so that slight changes in the inked regions are measured when inspecting using the ink mask and not when inspecting with the background mask. The mark ink region 66 (see FIG. 3C), and the character ink regions 68 (see FIG. 3D), including the padding factor two pixels wide around them, form defect analysis masks for the foregrounds of the mark and characters, respectively. The mark background region 64 and the character background regions 70, less a padding factor two pixels wide around the ink, form the defect analysis masks for the backgrounds.

To account for possible relative character shift within the mark 36, the image analyzer 18 may also include a component 46*c* to modify the masks used for mark foreground or background defect analysis. The masks are altered if any characters deviate appreciably from their relative training positions within the mark.

The image analyzer 18 further includes a background and foreground defect analysis report signal generating component for providing a report on the character or mark background or foreground to the monitor 32.

Typically reports for each character of the mark, as well as a report on the background of the mark 36, for extra ink or scratches, are provided using the invention. Whole mark defect analysis 46a alone would not provide separate scores for each character. Per character defect analysis 46b alone would not be sufficient because it would not inspect non-ink regions of the mark except where immediately adjacent to the ink.

The test reports, and the tests, can be enabled or disabled independently by the menu to achieve the best speed/performance mix.

In conducting operation of the system, the operator usually trains a registration model ("pin 1") to check the orientation of the object and to speed the search for the mark on the object, although this step is optional.

The operator then trains 39a a model 42a of the mark in a single step. This includes at least a search model. It also includes a defect analysis model if mark defect analysis has been enabled in the system. The operator sets a threshold level, as part of the training step, so that the defect analysis model also includes masks for distinguishing mark background and mark foreground.

The operator may enter the number of character lines appearing in the mark. The system then runs the auto-partitioner, or partitioning component 50, which uses blob analysis to automatically draw perimeters around characters for training purposes, and to assign the characters to lines. The operator sees the results of the partitioning component, and can confirm or modify the results.

If character searching is enabled, the system automatically trains models of the characters in the mark. If character defect analysis has been enabled in the system, defect analysis models of the characters are also trained in this step. Using the threshold level previously set, masks for distinguishing character background and character foreground are also created as part of the character defect analysis models.

Figure 3C:
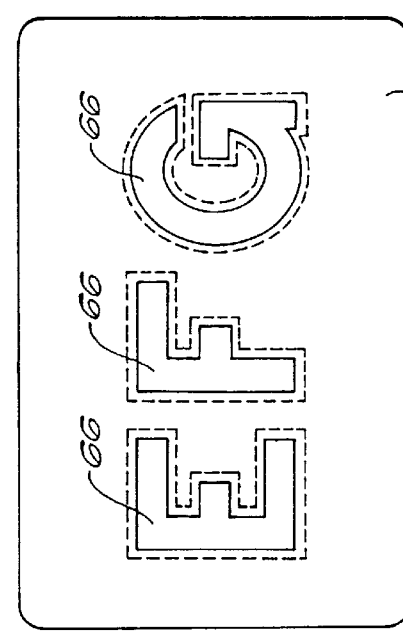
Figure 3D:
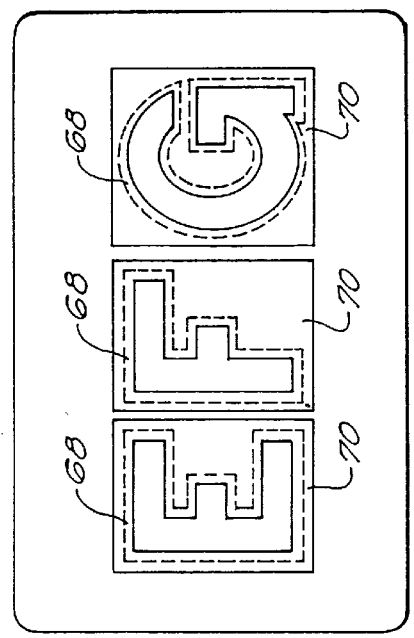

The system can then perform a defect analysis 46b of whole characters 62 (FIG. 3B) or of character ink 68 (FIG. 3D) or character background 70 (FIG. 3D). If mark inspection is enabled, the system can perform defect analysis 46a of the whole mark 60 (FIG. 3A) or of mark foreground 66 or mark background 64 (FIG. 3C).

The system can buffer images for subsequent processing during high-speed applications when a series of parts is presented rapidly, followed by idle time. It can be driven by the menu, by TTL lines, or by RS-232 commands. Inspection can be made to halt at the first error in a part, or processing can continue so that a full report is obtained. Inspection reports may be sent to the monitor, over the serial line, and/or over TTL lines.

Other variations of the system, which are here described in terms of software but could of course be embodied in hardware, will occur to those skilled in the art and are intended to be encompassed by the following claims. Thus, while the illustrated embodiments are discussed in connection with the inspection of integrated circuit marks, those embodiments may also be used to inspect a variety of other marks.

What is claimed is:

1. Apparatus for machine vision inspection of a candidate mark having at least one sub-component at a location within said candidate mark, said apparatus comprising:

video digitizing means for acquiring a candidate image of said candidate mark, and for acquiring at least one model image of an ideal mark;

search training means, responsive to said at least one model image, for generating a search model signal representative of said ideal mark as a whole, and of at least one sub-component of said ideal mark at a location within said ideal mark;

search means, responsive to said search model signal, and to said candidate image, for determining selected attributes of said candidate mark as a whole, and said at least one sub-component of said candidate mark, and for generating a signal representative of said selected attributes, said selected attributes including relative location and match score;

defect analysis training means, responsive to said at least one model image, for generating a defect signal representative of said ideal mark as a whole, and of said at least one sub-component of said ideal mark;

defect analysis means, responsive to said defect signal and to said candidate image, for generating a deviation signal indicative of a deviation of said candidate mark as a whole from said ideal mark as a whole, and indicative of a deviation of said at least one sub-component of said candidate mark from said at least one sub-component of said ideal mark;

partitioning means, cooperative with said search training means and said defect analysis training means, and responsive to said ideal mark, for generating signals representative of a plurality of respective locations of sub-components of said ideal mark, said partitioning means including organizing means for organizing said plurality of sub-components into lines and sub-component positions within each of said lines corresponding to said plurality of respective locations within said candidate mark; and output means, coupled to said search means and said defect analysis means, for generating a report signal representative of said selected attributes and said deviation of said candidate mark as a whole, and of said at least one sub-component of said candidate mark.

2. The apparatus of claim 1, wherein both said ideal mark and said candidate mark have a background and a foreground, wherein said defect analysis training means includes background training means and foreground training means for generating a defect analysis model of at least a portion of said background and at least a portion of said foreground of said ideal mark, wherein said defect analysis means includes background inspection means and foreground inspection means for inspecting at least a portion of said background and at least a portion of said foreground of said candidate mark, and wherein said output means includes means for generating a report signal that includes a signal representative of the deviation relative to the ideal mark of at least a portion of said background and said foreground of said candidate mark.

3. The apparatus of claim 1, wherein said defect analysis means includes:

means for accommodating displacement of said at least one sub-component of said candidate mark with respect to said location of a corresponding sub-component of said ideal mark within said ideal mark.

4. A method for machine vision inspection of a candidate mark having at least one sub-component at a location within said candidate mark, said method comprising the steps of:

acquiring a candidate image of said candidate mark, and acquiring at least one model image of an ideal mark;

generating signals representative of a plurality of respective locations of a plurality of sub-components of said ideal mark, including the step of organizing said plurality of sub-components into lines and sub-component positions within each of said lines corresponding to said plurality of respective locations within said ideal mark;

generating a search model signal representative of said ideal mark as a whole, and of at least one sub-component of said plurality of sub-components of said ideal mark at a respective location within said ideal mark;

determining selected attributes of said candidate mark as a whole, and said at least one sub-component of said candidate mark, and generating a signal representative of said selected attributes, said selected attributes including relative location and match score;

generating a defect signal representative of said ideal mark as a whole, and of said at least one sub-component of said ideal mark;

generating a deviation signal indicative of a deviation of said candidate mark as a whole from said ideal mark as a whole, and indicative of a deviation of said at least one sub-component of said candidate mark from said at least one sub-component of said ideal mark; and generating a report signal representative of said selected attributes and said deviation of said candidate mark as a whole, and of said at least one sub-component of said candidate mark.

5. The method of claim 4, wherein both said ideal mark and said candidate mark have a background and a foreground, further including the steps of:

generating a defect analysis model of at least a portion of said background and at least a portion of said foreground of said ideal mark;

inspecting at least a portion of said background and at least a portion of said foreground of said candidate marks; and generating a report signal that includes a signal representative of the deviation relative to the ideal mark of at least a portion of said background and said foreground of said candidate mark.

6. The method of claim 4, wherein said step of generating a deviation signal includes the step of:

accommodating displacement of said at least one sub-component of said candidate mark with respect to said location of a corresponding sub-component of said ideal mark within said ideal mark.

\* \* \* \* \*